United States Patent Office 3,641,094
Patented Feb. 8, 1972

3,641,094
PREPARATION OF ISOCYANATES
Dieter Arlt, Cologne-Buchheim, and Volkmar Handschuh, Burscheid, Germany, assignors to Farbenfabriken Bayer Aktiengesellschaft, Leverkusen, Germany
No Drawing. Filed Mar. 11, 1969, Ser. No. 806,276
Claims priority, application Germany, Mar. 12, 1968, P 16 68 109.7; Nov. 15, 1968, P 18 09 173.1
Int. Cl. C07c *119/04*
U.S. Cl. 260—453 PH                                8 Claims

ABSTRACT OF THE DISCLOSURE

Isocyanates are prepared by a process in which the primary amine is reacted with phosgene in the presence of an aqueous solution of an inorganic base and a hydrophobic inert organic solvent, preferably where the reaction of the primary amine and phosgene takes place in a time of less than one minute.

---

This invention relates to isocyanates and more particularly to a process for the preparation of isocyanates.

It is known that isocyanates can be prepared by reacting primary amines with excess phosgene, initially at temperatures near room temperature and then at higher temperatures up to the boiling point of the solvent used, generally up to about 100° C. to about 200° C., and then slowly introducing phosgene into the reaction mixture until the reaction is complete. In this second phase of the process, the hot phosgenation, hydrogen chloride is evolved and this escapes from the reaction mixture together with excess phosgene.

In a heretofore known modification of this process, instead of the free primary amines, their salts, usually the hydrochlorides, are slowly converted into isocyanates by a hot phosgenation according to the second stage of the process described above with mainly hydrogen chloride being driven off in this process. In this conventional process, the quantity of phosgene used is generally from 3 to 7 times the stoichiometrically calculated quantity. The hydrogen chloride which is formed frequently causes a highly undesirable corrosion of the apparatus in which the reaction is conducted and this accordingly necessitates costly expenditures on the apparatus. Another serious disadvantage of the conventional process for the production of isocyanates is the long reaction time required, usually about 4 to about 20 hours.

In German printed specification No. 1,233,854, a process in which isocyanates are prepared by phosgenation of primary amines in the presence of anhydrous tertiary amines is described. Although this process affords certain advantages, the use of the tertiary amines as auxiliary compounds entails considerable expenditures which again makes the advantages of this process questionable.

It is, therefore, an object of this invention to provide a process for the production of isocyanates without the foregoing disadvantages and problems. Another object of this invention is to provide a process for the production of isocyanates wherein only a slight excess of phosgene is required. A further additional object of this invention is to provide a process for the production of isocyanates which requires only a short time for its completion and has the advantage of very high volume/time yields and a substantial reduction in the corrosion of the reaction vessels.

The foregoing objects and others which will become apparent from the following description are accomplished in accordance with this invention, generally speaking, by providing a process for the production of isocyanates wherein primary amines are reacted with phosgene in the presence of aqueous solutions of inorganic bases and in the presence of hydrophobic, inert organic solvents. It was known that isocyanates are decomposed by water to form ureas and in addition it was feared that the aqueous alkaline solutions of phosgene would undergo extensive hydrolysis so that even in the unforeseeable event of a successful isocyanate synthesis, it was expected that a considerable excess of phosgene would be required. It is surprisingly found that as little as about 1.2 to 1.5 times the stoichiometrical quantity of phosgene is sufficiently adequate in the process of this invention. One particular advantage of the process is also the short time needed for its completion. The reaction proceeds so rapidly that it can be carried out continuously.

Another advantage is the possibility of using the process according to the invention for preparing low boiling isocyanates such as methyl, ethyl and propyl isocyanate which were difficult or impossible to obtain by the usual phosgenation methods.

The present invention thus relates to a process for the preparation of isocyanates, characterized in that primary amines are reacted with phosgene in the presence of aqueous solutions of organic bases and hydrophobic inert organic solvents at temperatures between about $-30°$ C. and about $+35°$ C. One may, of course, employ reaction temperatures above or below these limits, although the reaction temperatures are preferably between about $-20$ and about $+10°$ C. In particular, isocyanates which are slow to react can be prepared at higher temperatures. In a particularly preferred embodiment of this invention, isocyanates are produced by reacting primary amines with phosgene in the presence of an aqueous solution of inorganic bases and hydrophobic inert organic solvents at temperatures of between about $-30$ and $+35°$ C. wherein the reaction of the primary amine with phosgene takes place in a time of less than one minute.

Compared with the usual processes for the production of isocyanates, this preferred process affords the advantages of a very high volume/time yield and a substantial reduction in the corrosion of the reactors. Also the short reaction time used permits rapid separation of the reactants and frequently enables the yields to be considerably increased compared with the yields which are obtainable when the process is carried out using longer reaction times. The reactor used in this process may be any mixing apparatus in which amine, phosgene and an aqueous solution of an inorganic base can be intensively mixed in a short time, the amine and/or the phosgene usually being present in the form of a solution in a hydrophobic organic solvent.

For example, the reactants may be vigorously mixed in a mixing chamber or they may be supplied from two inlet nozzles so that very intensive mixing of the resulting liquid droplets takes place. Inert gases such as air or nitrogen may be used as propellants for atomizing the materials, and these gases may be recycled.

It is also possible to carry out a combination of the mixing described, such as, for example, the amine solution and aqueous liquor first being mixed as intensively as possible, and then droplets of the phosgene, for example, with nitrogen as the carrier gas, is then sprayed into the stream of this liquid mixture to cause the reaction itself to occur.

The reaction temperatures are kept in the range of about $-30$ to $+35°$ C., preferably $-10$ to $+10°$ C. by cooling the starting materials and/or the mixing apparatus and/or the propellant gas before use. A low boiling solvent which removes the heat of reaction during the reaction by partial evaporation may also be used.

The phases present in the reaction mixture are separated as completely as possible after the reaction. A cyclone separator may be used for removing the propellant gases, and the liquid phases may be separated in a separating vessel or preferably using a separator.

The separation of the phases may be followed by drying the organic solution which contains the isocyanate, using conventional drying agents such as calcium chloride, sodium sulphate or a zeolite and the like. Azeotropic dehydration is particularly useful and may be carried out in vacuum. In this procedure, drying is combined with isolation of the isocyanate since the crude isocyanate remains behind together with the solvent and may subsequently be purified, if desired, such as, for example, by distillation.

The phosgene used is generally about 1 to about 5 times the molar quantity of amine, and the excess phosgene may be returned, such as, for example, in the propellant gas cycle, and used again. Amine and phosgene are advantageously used in a molar ratio of about 1:1 to about 1:20, a molar ratio of about 1:1 to about 1:8 being preferred. In many cases, a molar ratio of amine to phosgene in the region of about 1:1 to about 1:2 has proved to be particularly suitable. The amount of aqueous liquor used is at least 2 mols for 1 mol of amine. Dosing of the materials is carried out such as, for example, with dosing pumps and should be as uniform as possible.

Especially high yields are obtained if no products which are only sparingly soluble in the solvents used are formed during the reaction.

Any suitable primary amine may be used in the process of this invention. As examples of such suitable primary amines there may be mentioned aliphatic acyclic and cyclic mono- and polyamines such as, for example: ethylamine, 2-chloroethylamine, allylamine, methallylamine, methylamine, n- or i-propylamine, tertiary butylamine, n-butylamine, n- or i-hexylamine, i-octylamine, 2-ethylhexylamine, i-nonylamine, i-dodecylamine, i-dodecenylamine, n-dodecylamine, cyclododecylamine, i-pentadecylamine, i-hexadecylamine, n-hexadecylamine, heptadecylamine, n-octadecylamine, hexamethylenediamine, cyclohexylamine, 1,4-tetramethylene diamine, 1,6-hexamethylene diamine, 1,8-diamino-p-menthane, 1-aminomethyl-5-amino - 1,2,3-trimethyl-cyclohexane, tetrahydro-tricyclopentadienylene diamine, 1-methylcyclohexane-2,4- and -2,6-diamine or any mixtures of these isomers, 4,4'-diamino-dicyclohexylmethane, 1,4 - diaminocyclohexane, and m- and p-xylylene diamine; aromatic mono- and diamines such as, for example, benzylamine, aniline, o-, m-, and p-bromo and chloroanilines, 2,6-diisopropylaniline, i-dodecylaniline, 3-chloro-4-methylaniline, 3,4-dichloroaniline, o-, m- and p-nitroaniline, xylidine, 2-methyl-6-ethylaniline, mesidine, 4 - methyl - 2,6-diethylaniline, 4-fluoro aniline, 4-trifluoromethyl aniline, 5,6,7,8-tetrahydronaphthylamine - (1), 2 - methyl - 4 - cyclohexylaniline, toluidine, 2,4-diamino-toluene, 2,6-diamino-toluene, 1,3-diamino-2,4,6-triisopropylbenzene, 4,4-diamino-diphenylmethane, 4,4' - diamino - 3,3',5,5'-tetraisopropyldiphenylmethane, 1,3,5-triisopropyl-2,4-diaminobenzene, 1,5-diaminonaphthalene, triphenylmethane-4,4',4''-triamine, tris-(4-aminophenyl)-(thio)-phosphoric acid esters and the like and etheramines and diamines such as aminopropylmethyl ether, aminopropyl ethyl ether, diaminopropyl ether, ethylene-bis-aminopropyl ether, anisidine, phenetidine and 4,4'-diamino diphenylether. Furthermore, amines and polyamines which contain ester groups, such as ethylamino-acetate, methyl aminocaproate, p-aminobenzoate, bis-aminoethylcarbonate, bis-aminopropylcarbonate and the aminoethyl ester of acrylic acid, methacrylic acid and the like may be employed. Mixtures of different amines may also, of course, be used.

As examples of suitable inorganic bases which may be used for the process of the invention there may be mentioned oxides, hydroxides, carbonates and bicarbonates of the alkali metals and alkaline earth metals, such as sodium and potassium hydroxides, calcium hydroxide, sodium and potassium carbonates and bicarbonates and the like, and alkali metal phosphates which are basic in reaction. Liquors which contain neutral salts such as sodium chloride or potassium chloride may also be used.

As examples of suitable hydrophobic, inert organic solvents which may be used there may be mentioned the following: methylene chloride, ethylene chloride, fluorodichloromethane, chloroform, carbon tetrachloride, 1,2-dichloropropane, benzene, toluene, xylene, petroleum hydrocarbons, butane, i-butane, cyclohexane, chlorobenzene and o-dichlorobenzene and esters such as alkyl acetate, butyl acetate and the like and ketones such as acetophenone and the like. In special cases, for example, where the products of the process are very strongly hydrophobic and the NCO group is particularly inert, the use of organic solvents may be dispersed with. Water may be used, in which case an additional quantity of liquor equivalent to the amount of hydrochloride must be used, but hydrophobic inert solvents may be included also in these cases.

Generally, the reaction is carried out by adding the amine, or a solution of the amine in an inert solvent, and the aqueous solution of the base simultaneously to a solution of phosgene in the inert organic solvent with stirring and cooling. During this operation, the pH of the mixture is preferably maintained between about 1 and 7 until all the amine has been added, and the solution is then made alkaline at the end of the reaction. The reaction mixture separates into an aqueous and an organic phase after the reaction. The organic phase which contains the isocyanate is separated and the isocyanate may be isolated in the usual manner, such as, for example, by fractional distillation or any other suitable separation procedure. The reaction time is less than one minute and in some cases only a few seconds or fractions of seconds.

The isocyanates obtained by the process of this invention may be used to prepare synthetic resins of the polyurethane type in the form of foams, elastomers, lacquers, coatings and the like, and may also be used as auxiliary materials for synthetic resins such as, for example, as chain extenders and may also be used as adhesives according to procedures known to those skilled in the art and also as plant protective agents.

The invention is further illustrated but is not intened to be limited by the following examples in which all parts and percentages are by weight unless otherwise specified.

EXAMPLE 1

About 120 parts of phosgene are dissolved in about 300 ml. of o-dichlorobenzene at about 0° C. About 73 parts of tertiary butylamine dissolved in about 100 ml. of o-dichlorobenzene and about 96 parts of sodium hydroxide dissolved in about 400 ml. of water are introduced dropwise simultaneously into the solution of phosgene at about 0° C. to about +5° C. over about 30 minutes. The reaction mixture is at the same time vigorously stirred and cooled to the given temperature. After the reaction, the phases are separated; the solution of the isocyanate is dried over sodium sulphate and fractionally distilled. About 72 parts, equal to about 73% of the theoretical, of tertiary butyl isocyanate of boiling point 84° C. to 85° C./760 mm. Hg are obtained.

EXAMPLE 2

About 164 parts of an amine which is obtained by the Ritter reaction from commercial dodecylene, hydrocyanic acid and sulphuric acid followed by hydrolysis of the resulting N-i-dodecylformamide and which has a boiling range of about 73° C. to 82° C./0.1 mm. Hg and an $NH_2$ content of about 8.1% are added dropwise in the course of about 25 minutes to a solution of about 100 parts of phosgene in about 500 ml. of methylene chloride at about 0° C. with stirring and cooling. About a further 20 parts of phosgene are introduced into the reaction mixture during the addition of the amine. At the same time, a solution of about 130 parts of sodium hydroxide in about 600 ml. of water is added dropwise at such a rate that a measuring electrode indicates a pH of about 2 until the addition of amine is completed; the remaining sodium hydroxide solution is then added dropwise in the course of about 15 minutes until a pH of about 7.4 is reached. The phases are then separated. The methylene chloride solution, after drying over calcium chloride is fractionally distilled. After removal of the methylene chloride by distillation followed by vacuum distillation, about 154 parts (equal to about 83% of the theoretical) of an i-dodecylisocyanate which has a boiling range of about 65° C. to about 75° C./0.3 mm. Hg and an NCO content of about 18.5% (calculated 18.8) are obtained.

EXAMPLE 3

About 177 parts of 2,6-diisopropylaniline, about 120 parts of sodium hydroxide, dissolved in about 800 ml. of water and about 45 parts of phosgene are added all together over about 30 minutes to a solution of about 130 parts of phosgene in about 500 ml. of methylene chloride. Vigorous stirring is continued during the reaction and the temperature is kept between about 0° C. and about +5° C. by cooling. After the reaction, about 20 parts of sodium hydroxide dissolved in about 100 ml. of water are added dropwise. The phases of the reaction mixture are separated, the organic phase is dried over sodium sulphate and the methylene chloride is distilled off. About 195 parts of a crude 2,6-diisopropylphenyl-isocyanate which has an NCO content of about 19.3 (calculated 20.6) remains behind. Yield: higher than about 93% of the theoretical.

EXAMPLE 4

About 50 parts of 1,3-diamino-2,4,6-tri-isopropylbenzene dissolved in about 200 ml. of methylene chloride are added dropwise between about −5° C. and about +5° C. with stirring and cooling to a mixture of a solution of about 75 parts of phosgene in about 200 ml. of methylene chloride and about 50 ml. of water. At the same time, about 175 ml. of about a 31% sodium hydroxide solution are added dropwise at such a rate that a measuring electrode indicates pH values of about 1 to about 7 up to the end of the addition of the amine. The addition of amine is finished after about 15 minutes. The remainder of the sodium hydroxide solution is added dropwise at such a rate that the reaction mixture has a pH of about 6 to about 7, and towards the end about 7 to about 10. The addition of sodium hydroxide solution is completed after about 40 minutes.

The phases of the reaction mixture are separated and the methylene chloride solution is dried over sodium sulphate. After removal of the methylene chloride by distillation, about 60 parts of crude 1,3-diisocyanato-2,4,6-tri-isopropylbenzene remain behind which has an NCO content of about 28.7 (calculated 29.4). Yield: above 97% of the theoretical.

EXAMPLE 5

About 255 parts of an amine mixture which consists mainly of 9-amino-heptadecane and which has been obtained from ketones of the fatty acid of coconut oil are added dropwise at about 0° C., together with a solution of about 160 parts of sodium hydroxide in about 400 ml. of water, to a solution of about 150 parts of phosgene in about 500 ml. of methylene chloride. The reaction mixture is also stirred vigorously and the sodium hydroxide solution is added at such a rate that after about 15 minutes, when all the amine has been added, the pH of the mixture is about 1 to about 7. After about a further 25 minutes, the sodium hydroxide solution has been added and the final pH value is about 13. The reaction mixture is separated, the isocyanate solution is dried over sodium sulphate and the crude isocyanate is distilled under vacuum. About 245 parts of a heptadecylisocyanate which boils in the range of about 140° C. to about 170° C./0.4 mm. Hg are obtained which has an NCO content of about 14.9 (calculated 14.9). Yield: about 87% of the theoretical.

EXAMPLE 6

About 150 parts of phosgene are dissolved in about 200 ml. of methylene chloride. To this solution is added dropwise, a solution of about 62 parts of 1,6-hexamethylene diamine in about 250 ml. of methylene chloride with vigorous stirring over about 15 minutes at about −5° C. and at the same time sodium hydroxide solution is added at such a rate that the pH of the mixture is kept between about 2 and about 5. The remainder of a solution of about 140 parts of sodium hydroxide in about 400 ml. of water is then added dropwise within the course of about a further 20 minutes until finally a pH of about 13 is obtained. The phases of the reaction mixture are separated and the methylene chloride solution is dried over sodium sulphate and distilled. About 48 parts (about 55% of theoretical) of hexamethylene-1,6-diisocyanate boiling in the range of about 100° C. to about 112° C./0.4 mm. Hg are obtained which has an NCO content of about 49.5% (calculated 50.0%).

EXAMPLE 7

About 80 parts of phosgene are dissolved in about 350 ml. of toluene at about −20° C. The solution is stirred with about 50 ml. of concentrated sodium chloride solution and a pH measurement electrode is dipped into the mixture. About 15 parts of methylamine are introduced over about 20 minutes at about −10° C. to about −20° C. and at the same time about 90 parts of about a 25% solution of sodium hydroxide in water are added dropwise at such a rate that the pH measured is about 4 to about 6.5. When the addition of amine is completed, more sodium hydroxide solution is added in the course of about a further 15 minutes until a pH of about 10 is reached. The phases of the reaction mixture are separated and the aqueous phase is extracted with toluene. The solution of the resulting methyl isocyanate in toluene is dried over calcium chloride. The isocyanate content is determined by reacting the product with a 1 N solution of dibutylamine in chlorobenzene and titrating the unreacted dibutylamine with hydrochlorice acid. The toluene solution (340 parts) contains about 3.4% of methyl isocyanate. This corresponds to about 11.5 parts of methyl-isocyanate which is equal to about 49% of the theoretical.

The apparatus used for carrying out the following examples of the preferred process of this invention consists of a system of two mixing chambers. In the first mixing chamber, amine solution and aqueous alkaline liquor introduced through a dosing pump are intensively mixed together, and in the second mixing chamber this two phase mixture is intensively stirred with phosgene solution with the aid of a stream of nitrogen and allowed to react. On leaving the mixing chamber, the reaction products reach a cyclone separator in which the liquid and gas are sequarated from each other. The liquid is trapped and the organic phase is separated from the aqueous phase, dried and distilled off, if desired, under vacuum. The residence time of the reactants in the reaction chamber is from about $10^{-4}$ to $10^{-2}$ second in the following examples.

EXAMPLE 8

A one molar n-butylamine solution in methylene chloride cooled to about −20° C. and 20% sodium hydroxide solution cooled to the same temperature are forced under pressure into the first mixing head. The stream of amine solution is adjusted to about 4 mols per hour, the stream of lye to about 16 mols per hour. A 25% solution of phosgene in methylene chloride which has been cooled to about 50° C. to 70° C. is sprayed in through a stream of nitrogen of about 4 to 4 m.$^3$/hr. and the rate adjusted to about 6 mols per hour. The temperature of the reaction products after the mixing chamber is kept between about 0° C. and 5° C. by cooling the starting materials before use and by evaporation of a part of the solvent.

After about 15 minutes operation, the liquid phases trapped in the separating funnel are separated from each other and the organic phase is dried with calcium chloride and distilled. About 88 parts of n-butylisocyanate are isolated. When the throughput is about 1 mol of n-butylamine, this corresponds to a yield of about 89%.

EXAMPLE 9

By the same process as described in Example 8, 85 parts of tertiary butyl isocyanate, corresponding to a yield of about 86%, are obtained by distillation after a throughput of about 1 mol of tertiary butylamine.

EXAMPLE 10

A one molar solution of aniline is used in the same process given in Example 8. After a throughput of about 1 mol of aniline, 114 parts of phenylisocyanate, corresponding to a yield of about 96%, are obtained by distillation.

EXAMPLE 11

A one molar solution of p-chloroaniline is used by the same process as in Example 8. After a throughput of 1 mol, 144 parts of p-chlorophenylisocyanate, corresponding to a yield of about 94%, are obtained by distillation.

EXAMPLE 12

A half molar solution of hexamethylene diamine is used in the same process given in Example 8. After a throughput of about half a mol of hexamethylene diamine, the two phases are separated and the organic phase is recovered by distillation. About 44 parts of hexamethylene diisocyanate, corresponding to a yield of about 52%, are obtained.

EXAMPLE 13

A half molar solution of 4,4'-diaminodiphenylmethane in methylene chloride is used in the same process described in Example 8. After a throughput of about half a mol, the two phases are separated and the organic phase is dried over a zeolite and distilled. About 81 parts of 4,4-' diisocyanato diphenyl methane, corresponding to a yield of about 65%, are obtained. The distillation residue is about 29 parts and this has an isocyanate content, determined by titration, of about 29%.

EXAMPLE 14

An 11% solution of methylamine in liquid propane and a 20% aqueous sodium hydroxide solution and a 50% solution of phosgene in liquid propane are reacted together in a 3-material mixing chamber with intensive mixing and venting to release of pressure. The heat or reaction is compensated by the evaporation of propane, phosgene and the methyl isocyanate formed, and the temperature of the reaction products is adjusted to about −10° C. by suitable choice of the quantities of amine and phosgene solution used.

The concentrations of starting materials are chosen so that all the reaction products except the reacted sodium hydroxide solution which is removed in a cyclone separator remains gaseous. After the cyclone separator, these gaseous reaction products are dried in a calcium chloride drying tower and then condensed in cooling traps. Gas chromatographic investigation of the reaction products indicated at about 90% to 100% yield of methyl isocyanate.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A process for the preparation of isocyanates wherein a primary amine is reacted with phosgene at a temperature of from about −30° C. to about 35° C. in the presence of an aqueous solution of at least 2 mols per mol of amine of an inorganic base selected from the group consisting of oxides, hydroxides, carbonates and bicarbonates of alkali metals and alkaline earth metals and alkali metal phosphates and a hydrophobic inert organic solvent.

2. The process of claim 1 wherein a pH range of from 1 to 7 is maintained during the reaction and a pH above 7 at the end of the reaction.

3. The process of claim 1 wherein the reaction of the primary amine with phosgene takes place within a time of less than one minute.

4. The process of claim 3 wherein the amine and phosgene are used in a molar ratio of from 1:1 to 1:20.

5. The process of claim 3 wherein the amine and phosgene are used in a molar ratio of from 1:1 to 1:8.

6. The process of claim 3 wherein the amine and phosgene are used in a molar ratio of from 1:1 to 1:2.

7. The process of claim 1 wherein the reaction of the primary amine with phosgene takes place within $10^{-4}$ to $10^{-2}$ seconds.

8. The process of claim 1 wherein the primary amine is selected from the group consisting of methylamine, butylamine, dodecylamine, heptadecylamine, hexamethylene diamine, aniline, p-chloroaniline, 2,6-diisopropylaniline, 1,3-diamino-2,4,6-tri-isopropylbenzene and 4,4'-diaminodophenylmethane.

References Cited

UNITED STATES PATENTS

| 2,640,068 | 5/1953 | Schaefer et al. | 260—453 |
| 3,465,023 | 9/1969 | Kamal | 260—453 |

HENRY R. JILES, Primary Examiner

D. H. TORRENCE, Assistant Examiner

U.S. Cl. X.R.

260—939, 944